Patented May 12, 1931

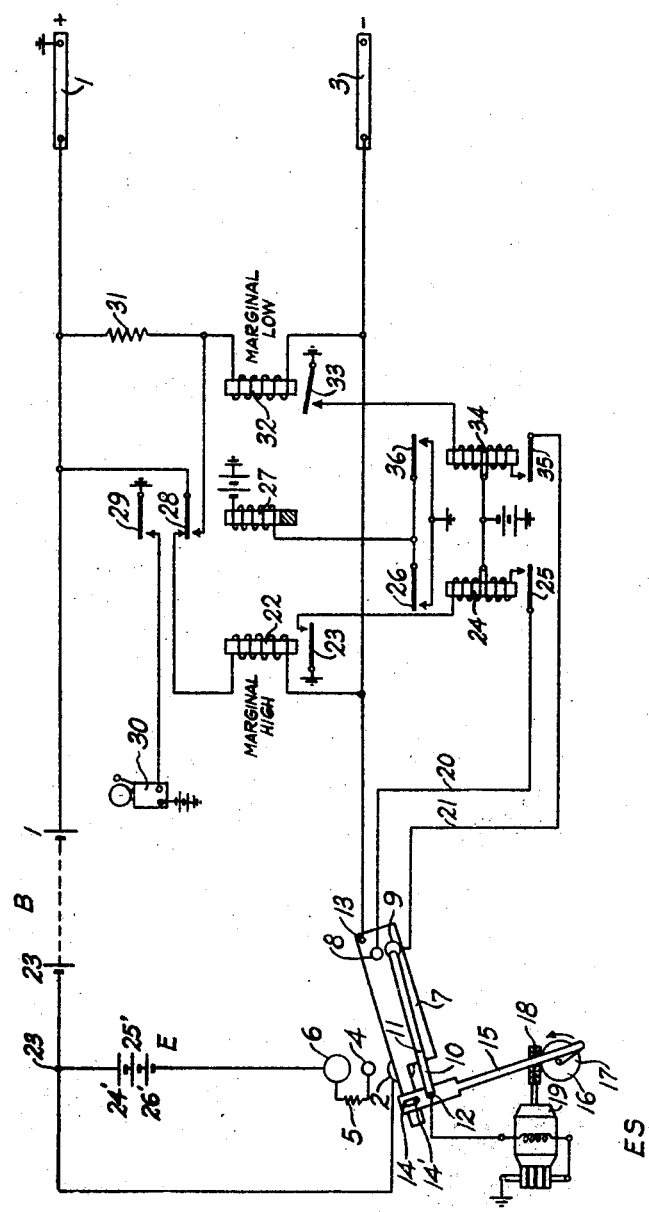

1,804,768

UNITED STATES PATENT OFFICE

HERMAN HENRY HARBECKE, OF CHICAGO, ILLINOIS, ASSIGNOR TO RESERVE HOLDING COMPANY, OF KANSAS CITY, MISSOURI, A CORPORATION OF DELAWARE

VOLTAGE CONTROL SYSTEM

Application filed January 26, 1928. Serial No. 249,622.

The present invention relates, in general, to voltage control equipment used in connection with battery charging and regulating systems, and is concerened, more particularly, with provisions for connecting end cells to and disconnecting the same from a storage battery in accordance with the rise or fall of the battery voltage.

The principal object of the invention is to provide equipment for accomplishing the above result which is of simple construction and more positive in operation than was heretofore considered possible.

A brief description of the nature of the equipment shown in the drawing will now be given, so that a better understanding may be had of the detailed description which is yet to follow, when taken in conjunction with the accompanying single sheet of drawing diagrammatically representing the equipment employed and the circuits therefor.

Referring to the drawing, a storage battery comprising 23 cells is shown at B, and a number of end cells are indicated at E. These end cells are provided for raising the voltage in case it has fallen below a predetermined limit. An end cell switch ES is provided for this purpose, which is automatically controlled by the relay equipment comprising relays 24 and 34; and these latter relays in turn are controlled by the marginal high- and low-relays 22 and 32. Reference numerals 1 and 3 indicate bus bars used for feeding current to other equipment in the usual manner. One pole of the storage battery is grounded as is usual, and this ground connection is shown applied to the bus bar 1. A plurality of ground and battery connections have been indicated in the drawing; it will be understood, of course, that this was done merely for the sake of conveniently describing the invention, and that the entire equipment is operated from the storage battery shown in the drawing.

The detailed explanation will now be presented.

The end cell switch ES comprises a motor 19 provided with a worm shaft 18 which is adapted to operate a worm wheel 16. Attached to the worm wheel 16 is a lever 17 for moving an arm 15 in a longitudinal direction. This arm 15 has, at its upper end, a slot 14, and extending into this slot is a pin 14' which is mounted on the switch blade 7. A slight up and down motion of the arm 15, to the extent of the length of the slot 14, will have no effect on the switch blade 7 which is pivoted at point 13.

A lever 10 is pivotally mounted on the switch blade 7, at point 11, and attached to the arm 15 at point 12. Therefore, a motion of the arm 15 within the limits of slot 14 will be effective to switch the lever 10 back and forth between the contact points 8 and 9, alternately connecting the lever 10 to conductors 20 and 21 which are wired to the armatures 25 and 35, respectively of the high- and low voltage control relays 24 and 34, thereby establishing connection between the motor 19 and these armatures, since the motor is connected to the lever 10 as indicated at point 12.

In the position shown in the drawing, the battery B, comprising 23 cells, is connected across the bus bars 1 and 3 via contact point 2 and the switch blade 7. The equipment connected to the bus bars 1 and 3 is adjusted to respond properly to a voltage varying between 46 and 52 volts. Should the voltage fall below 46 volts or rise above 52 volts, the regulating equipment shown will operate and adjust the voltage. The charging of the battery may be accomplished by manually or automatically connecting a motor generator or other suitable charging equipment in any desired and well known manner.

The operation of the equipment shown is as follows:

It is assumed in the drawing that the battery B is connected across the bus bars 1 and 3. Relay 32 is connected in bridge of the bus bars in series with a resistance 31. This relay is adjusted to operate at 46 volts. Accordingly, as long as the battery voltage across the bus bars is maintained above 46 volts, the relay 32 will be in operated position, and will have attracted its armature 33, thereby keeping ground disconnected from the upper high resistance winding of relay 34. Relay 22 is a marginal relay and adjusted to operate when the battery voltage reaches 52 volts. Assuming that the battery voltage is within the desired limits, that is, above 46, but not exceeding 52 volts, relay 32 will be energized as described above, and relay 22 will be in deenergized position. Under the assumed conditions, the entire equipment will be in the position shown in the drawing.

It will be assumed now that the battery voltage falls below 46 volts. In this case, relay 32 deenergizes and closes at its armature 33 a circuit for the upper winding of relay 34. The latter relay energizes and attracts its armature 36, thereby closing a circuit from ground on the make contact of armature 36 to the winding of the relay 27. This relay energizes and operates its armature 28 disconnecting thereby the marginal relay 22 from the bus bars, and short circuiting the resistance 31 which is normally connected in series with the relay 32. As a result of the short circuiting of the resistance 31, relay 32 operates again, being connected directly across the battery B, attracts its armature 33 and thereby deenergizes the upper winding of relay 34. This latter relay, however, upon energizing, had attracted its armature 35 and had closed thereby a circuit for the motor 19 which may be traced from battery, lower winding of relay 34, make contact and armature 35, conductor 21, contact point 9, lever 10, motor 19 to ground. The motor 19 operates in this circuit in series with the low resistance winding of relay 34, and, as long as the motor is connected in this circuit, relay 34 is maintained energized. The restoration of relay 34 depends therefore entirely on the operation of the motor 19, which, at a certain point of its operation, will cause the opening of the above circuit by disconnecting the lever 10 from contact point 9. This is accomplished as follows:

The motor 19 operates the worm wheel 16 in the direction indicated by the arrow, thereby rotating the lever 17 and pushing the arm 15 upwards in order to operate the switch blade 7 to include the end cells 24′, 25′ and 26′ in series with the battery B for the purpose of raising the battery voltage across the bus bars. The slot 14 in the arm 15 is at this moment of the operation in the position shown in the drawing, i. e., the slot 14 engages the pin 14′ provided on the switch blade 7. Therefore, the upward movement of the arm 15 will lift the switch blade 7 from its position shown in the drawing thereby disconnecting the negative bus bar from connection with point 2. Before leaving the contact point 2, the switch blade 7 engages contact point 4, which is provided in order to accomplish a switching over without disconnecting the battery. The resistance 5 is provided in order to prevent a short circuiting of the end cells E. From the contact point 4, the switch blade 7 is switched further on to the contact point 6. When this is accomplished, the end cells E are connected in series with the battery B as is obvious from the drawing. The lever 15 will be now in its highest center position with regard to the worm wheel 16. The lever 10 which maintains the connection between the motor and the battery via armature 35 and the low resistance winding of relay 34, was maintained in the position shown in the drawing during the entire upward movement of the arm 15. The movement of the switch lever continues now in a downward direction, the arm 17 forcing the arm 15 to the left of the worm wheel 16 beyond the highest center point. When this downward movement commences, the slot 14 will slide past the pin 14′. Therefore, the downward movement will not be effective to the switch blade 7. However, due to the lever arrangement discussed elsewhere, the lever arm 10 will immediately follow the downward movement of the arm 15 and thereby disconnect the motor from engagement with the conductor 21 via contact point 9, and connect the motor to conductor 20 via contact point 8.

When the motor 19 is disconnected as was discussed above, no further movement can take place, and the switch blade 7 remains in engagement with the contact point 6, maintaining the connection of the end cells in series with the battery B. Due to the switching action of lever 10, at the moment of the opening of the motor circuit, the relay 34 which was maintained energized over its lower winding in series with the motor, will deenergize now and restore the equipment to the position shown in the drawing. Due to the opening of armature 36, relay 27 deenergizes and reconnects the marginal relay 22 to the bus bars. The inclusion of the end cells 24′, 25′, and 26′ causes a rise in the voltage across the bus bars, and the marginal relay 32 will consequently remain energized in series with the resistance 31.

If it is assumed that the battery voltage now exceeds the upper limit of 52 volts, the marginal relay 22 which is connected across the bus bars at armature 2 of relay 27, will energize. At armature 23 a circuit is then closed for the upper high resistance winding of relay 24 which energizes and attracts its armatures 25 and 26. At armature 25 a circuit is closed for the operation of the motor 19 via lever 10 and contact point 8, conductor 20 and armature 25 of relay 24, lower winding of relay 24 to battery. The motor operates as in the case described previously, to withdraw the switch blade 7 from engagement with contact point 6 and to disconnect thereby the end cells E. At armature 26 the relay 24 closes a circuit for the control relay 27 which disconnects the marginal relay 22 at armature 28 and closes at this armature a direct circuit for the marginal relay 32 across the bus bars 1 and 3. Relay 22 thereupon deenergizes opening its armature 23 again. However, relay 24 cannot deenergize, being locked up over its lower winding and armature 25 in series with the motor 19. The operation of the motor will continue until the lever 15 reaches its lowermost position with respect to the worm wheel 16, when the disconnection of the end cells is accomplished. A further rotation of the worm wheel 16 will move the lever arm 15 upwards and disconnect the lever 10 from engagement with the contact point 8, opening thereby the circuit for the motor 19 and for relay 24 over its lower holding winding. When this is accomplished, the equipment is again at rest.

Relay 27 is provided with a copper slug at its armature end which is indicated in the drawing by a shaded lower end of the relay 27. This copper slug causes the relay 27 to attract its armatures 28 and 29 slowly, in order to furnish a sufficient time interval for the operation of the marginal relay 22 in the case described in the foregoing paragraph.

Relay 27 remains operated during the entire operation of the motor 19, maintaining its armature 29 closed, which provides a circuit for an alarm signal 30. This alarm signal may be a buzzer or a bell, and is provided to draw the attention of the exchange attendant to the circuit changes accomplished by the equipment shown.

Assuming that the desired regulation of the battery voltage is not accomplished with one switching operation, which may be the case if the battery B is entirely discharged and below 46 volts, and further assuming that the end cells E are not connected at all by the switching operation of the switch ES, due to some fault, or do not furnish the necessary current for raising the battery voltage across the bus bars, the switch ES will be operated intermittently, and thus, the alarm 30 will be sounded interruptedly whenever the motor 19 operates. The office attendant will then test the voltage of the end cells and of the battery B and will eliminate the trouble.

Having described the invention in detail, what is believed to be new and desired to have protected by Letters Patent will be pointed out in the following claims:

What is claimed is:

1. In a voltage regulating system, a storage battery and a discharge circuit therefor, a plurality of normally disconnected reserve cells, a first relay connected across said battery and responsive to a lowering of the voltage thereof below a predetermined limit, a second relay having an operating winding and a holding winding, means operated by said first relay for closing a circuit for said second relay over its operating winding, a third relay operated by said second relay for restoring said first relay to its original position to disconnect the operating winding of said second relay, a switching device and a circuit therefor, means operated by said second relay for closing the circuit of said switching device and for including its holding winding in said circuit, means operated by said switching device for including said reserve cells in the discharge circuit of said battery, and means then operated by said switching device for interrupting its own circuit and the circuit over the holding winding of said second relay to restore said second and third relays to original position and to maintain said reserve cells in the discharge circuit.

2. In a voltage regulating system, a storage battery and a discharge circuit therefor, a plurality of normally disconnected reserve cells, a first relay connected across said battery and responsive to a lowering of the voltage thereof below a predetermined limit, a second relay having an operating winding and a holding winding, means operated by said first relay for closing a circuit for said second relay over its operating winding, a third relay operated by said second relay for restoring said first relay to its original position to disconnect the operating winding of said second relay, a switching device and a circuit therefor, means operated by said second relay for closing the circuit of said switching device and for including its holding winding in said circuit, means operated by said switching device for including said reserve cells in the discharge circuit of said battery, means then operated by said switching device for opening its own circuit and the circuit over the holding winding of said second relay to restore said second and third relays and to maintain said reserve cells in said discharge circuit, a fourth relay responsive to a rise of the voltage above a predetermined limit and connected across said discharge circuit upon restoration of said third relay, and means operated by said fourth relay to again operate said third relay and said switching device to remove said reserve cells from said discharge circuit.

3. In a voltage regulating system, a storage battery and a discharge circuit therefor, a plurality of normally disconnected reserve cells, a first relay connected across said battery and responsive to a lowering of the voltage thereof below a predetermined limit, a second relay having an operating winding and a holding winding, means operated by said first relay for closing a circuit for said second relay over its operating winding, a third relay operated by said second relay for restoring said first relay to its original position to disconnect the operating winding of said second relay, a switching device and a circuit therefor, means operated by said second relay for closing the circuit of said switching device and for including its holding winding in said circuit, means operated by said switching device for including said reserve cells in the discharge circuit of said battery, means then operated by said switching device for opening its own circuit and the circuit over the holding winding of said second relay to restore said second and third relays and to maintain said reserve cells in said discharge circuit, a fourth relay, responsive to a rise of the voltage above a predetermined limit and connected across said discharge circuit upon restoration of said third relay, a fifth relay having windings corresponding to the windings of said second relay, means operated by said fourth relay for closing an operating circuit for said fifth relay, means operated by said fifth relay for energizing said third relay to restore said fourth relay to disconnect the operating circuit of said fifth relay, means operated by said fifth relay to close a circuit for said switching device and to include its holding winding in said circuit, said switching device being adapted upon reoperation to remove said reserve cells from said discharge circuit and to thereupon open the circuit of said fifth relay.

4. In a voltage regulating system, a storage battery and a discharge circuit therefor, a plurality of normally disconnected reserve cells, a first relay connected across said battery and responsive to a lowering of the voltage thereof below a predetermined limit, a second relay having an operating winding and a holding winding, means operated by said first relay for closing a circuit for said second relay over its operating winding, a third relay operated by said second relay for restoring said first relay to its original position to disconnect the operating winding of said second relay, a motor driven switching device comprising a worm gear movable in one direction only, a circuit for said motor, means operated by said second relay for closing the circuit of said motor and for including its holding winding in said motor circuit, means operated by said device for including said reserve cells in the discharge circuit of said battery, and means then operated by said device for interrupting its own circuit and the circuit over the holding winding of said second relay to restore said second and third relays and to maintain said reserve cells in the discharge circuit.

5. In a voltage regulating system, a storage battery and a discharge circuit therefor, a plurality of normally disconnected reserve cells, a first relay connected across said battery and responsive to a lowering of the voltage thereof below a predetermined limit, a second relay having an operating winding and a holding winding, means operated by said first relay for closing a circuit for said second relay over its operating winding, a third relay operated by said second relay for restoring said first relay to its original position to disconnect the operating winding of said second relay, a motor driven switching device comprising a worm gear movable in one direction only, and adapted to oscillate a lever arm terminating in a contact member, a circuit for said motor, means operated by said second relay for closing said circuit in series with said holding winding, contact terminals accessible to said contact member for including said reserve cells in said discharge circuit, and means then operated by said lever arm for opening the circuit for said motor and of said holding winding without further moving said contact member, to restore said second and third relays and to maintain said reserve cells in said discharge circuit.

6. In a voltage regulating system, a storage battery and a discharge circuit therefor, a plurality of normally disconnected reserve cells, a first relay connected across said battery and responsive to a lowering of the voltage thereof below a predetermined limit, a second relay having an operating winding and a holding winding, means operated by said first relay for closing a circuit for said second relay over its operating winding, a third relay operated by said second relay for restoring said first relay to its original position to disconnect the operating winding of said second relay, a motor driven switching device comprising a worm gear movable in one direction only, and adapted to oscillate a lever arm terminating in a contact member, means operated by said second relay for closing a circuit for said motor in series with said holding winding, terminals of said discharge circuit accessible to said member for including said reserve cells in said discharge circuit, an auxiliary lever pivotally mounted on said member, means operated by said lever arm after including said reserve cells in the discharge circuit, for actuating said auxiliary lever without moving said contact member, and contacts accessible to said auxiliary lever for opening the circuit of said motor and of said holding winding to restore said second and third relays and to maintain said reserve cells in said discharge circuit.

7. In a voltage regulating system, a storage battery and a discharge circuit therefore, a plurality of reserve cells, a motor driven switching device comprising a worm gear movable in one direction only, a control mechanism responsive to a rise or fall of the voltage in said discharge circuit beyond predetermined limits for operating said device to regulate said voltage by means of said reserve cells, and means in said device to thereafter restore said control mechanism to normal position.

8. In a voltage regulating system a storage battery, and a discharge circuit therefor, a plurality of reserve cells, a motor driven switching device comprising a worm gear movable in one direction only and adapted to oscillate a lever arm terminating in a contact member, a control mechanism responsive to a rise or fall of the voltage in said discharge circuit beyond predetermined limits for operating said device to operate said lever arm and said contact member to regulate said voltage by means of removing said reserve cells from or including said cells in said discharge circuit, and means thereafter operated by said lever arm without moving said contact member for restoring said control mechanism to normal position.

9. In a voltage regulating system, a storage battery and a discharge circuit therefor, a plurality of reserve cells, a contact member having access to terminals of said discharge circuit and of said reserve cells, a lever arm movably connected with said member, an auxiliary lever pivotally mounted on said member, a worm gear and a motor for moving the same in one direction only, said gear being adapted to oscillate said lever arm, a control mechanism responsive to a rise or fall of the voltage in said discharge circuit beyond predetermined limits for starting said motor to actuate said lever arm and said contact member to regulate said voltage by means of removing said reserve cells from or including said cells in said discharge circuit, and means on said lever arm for thereafter operating said auxiliary lever to stop said motor and to restore said control mechanism to original position.

10. In a voltage regulating system, a storage battery, a discharge circuit therefor, a plurality of reserve cells, a switching device, control means, means responsive to a rise or fall of the voltage in said discharge circuit beyond predetermined limits for actuating said control means to operate said switching device to thereby regulate said voltage by means of said reserve cells, and means in said switching device effective after each voltage regulation thereby for terminating the operation of said switching device independent of any additional action by said control means, and for restoring said control means.

In witness whereof, I hereunto subscribe my name this 23d day of January, A. D. 1928.

HERMAN HENRY HARBECKE.